June 24, 1930.  L. J. KLUNK  1,766,438
SAW FILING MACHINE
Filed Sept. 8, 1927  3 Sheets-Sheet 1

Inventor
L. J. Klunk.
By Lacey & Lacey, Attorneys

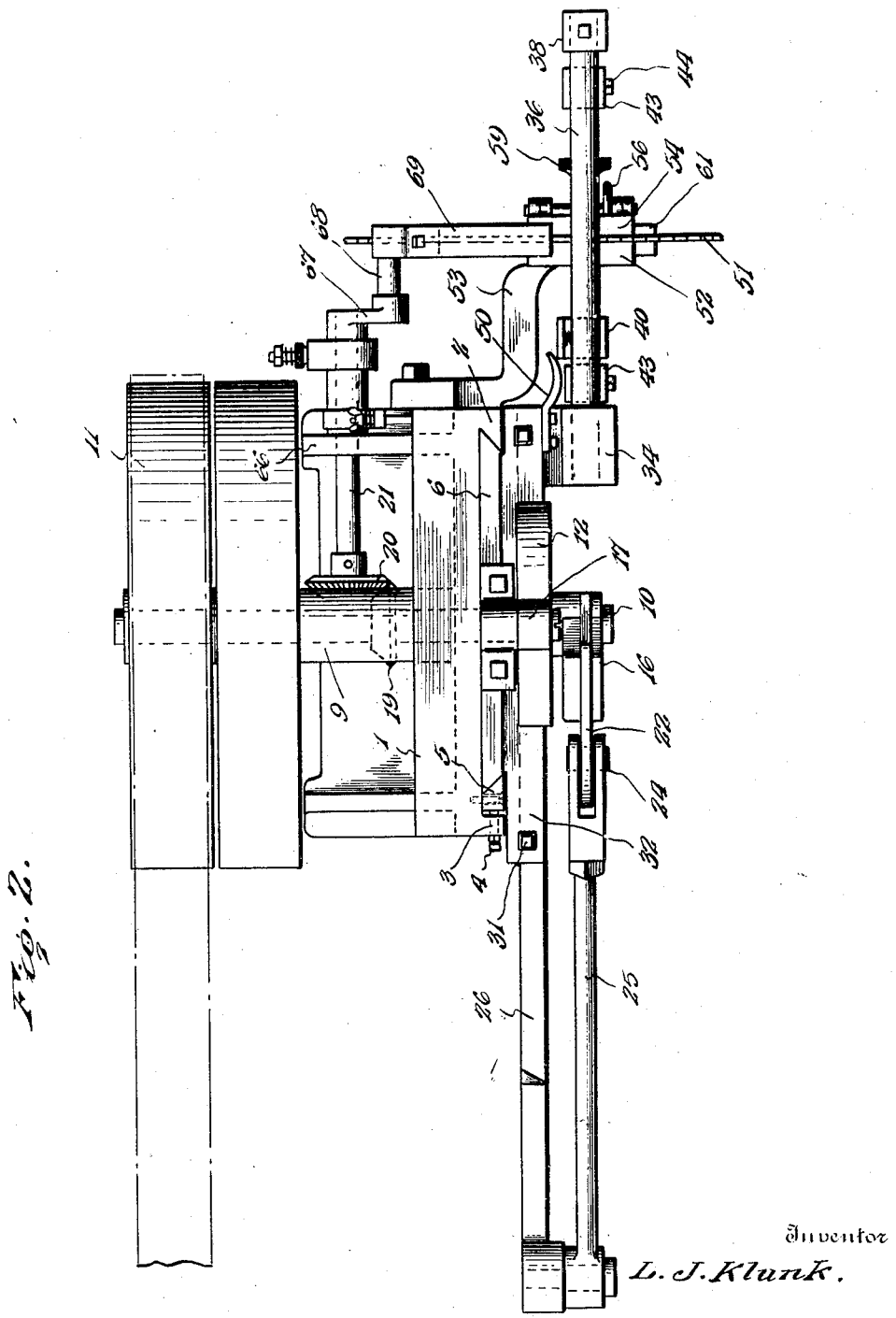

June 24, 1930.  L. J. KLUNK  1,766,438
SAW FILING MACHINE
Filed Sept. 8, 1927   3 Sheets-Sheet 3
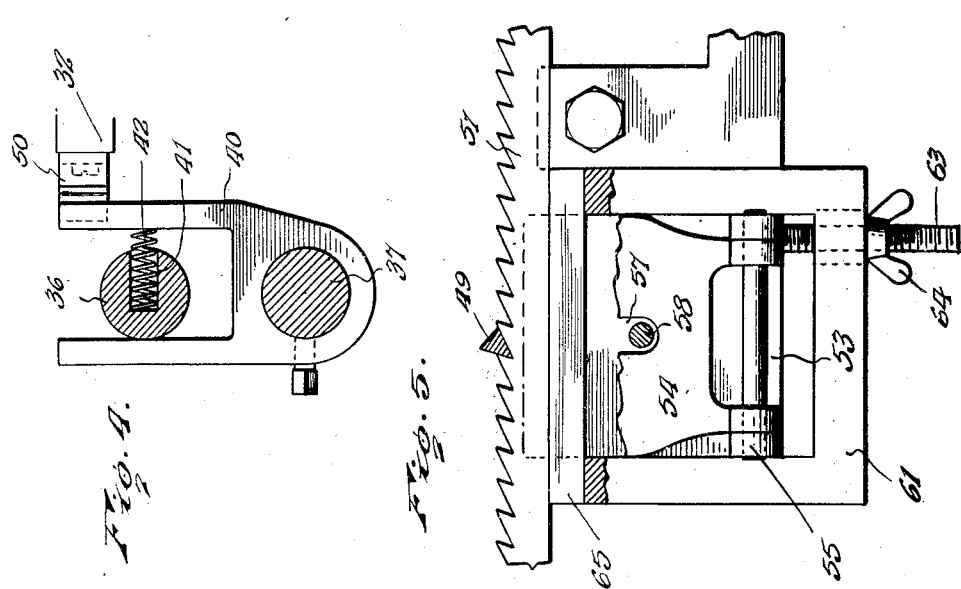
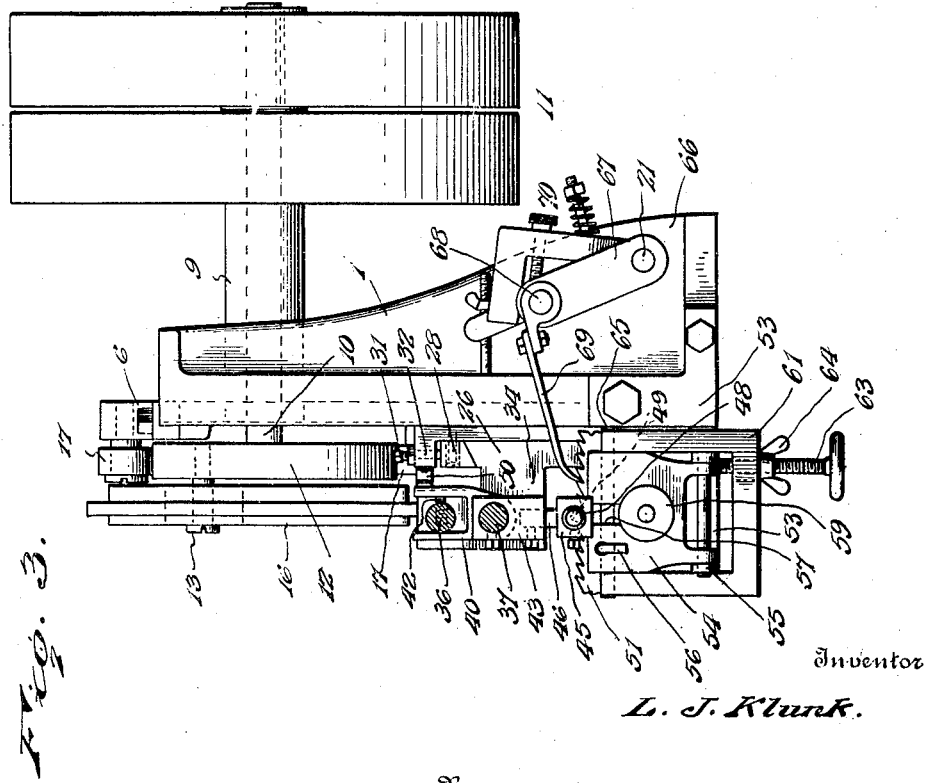
Inventor
L. J. Klunk.
By Lacey & Lacey, Attorneys Patented June 24, 1930

1,766,438

UNITED STATES PATENT OFFICE

LOUIS J. KLUNK, OF YORK, PENNSYLVANIA, ASSIGNOR TO BEAVER SAW FILING MACHINE CO., OF YORK, PENNSYLVANIA, A CORPORATION OF PENNSYLVANIA

SAW-FILING MACHINE

Application filed September 8, 1927. Serial No. 218,203.

The primary object of this invention is to provide a saw-filing machine in which the file is moved into engagement with the saw teeth and withdrawn therefrom upon a line oblique to the saw rather than at a right angle thereto so that the withdrawal of the file will not damage the point of the saw tooth which has been sharpened. The invention also has for its object the provision of a novel support for the saw and the provision of means whereby the file will be drawn across the saw blade slowly on its working stroke but will be moved more rapidly upon its return stroke. These stated objects, and other objects which will incidentally appear in the course of the following description, are attained in such a machine as is illustrated in the accompanying drawings, and the invention resides in certain novel features which will be particularly pointed out in the appended claims.

In the drawings:

Fig. 2 is a plan view of the same;

Fig. 3 is an end elevation, with parts in section, on the line 3—3 of Fig. 1;

Fig. 4 is an enlarged detail section, and

Fig. 5 is an enlarged detail sectional elevation of the saw support and guide.

Figure 1:
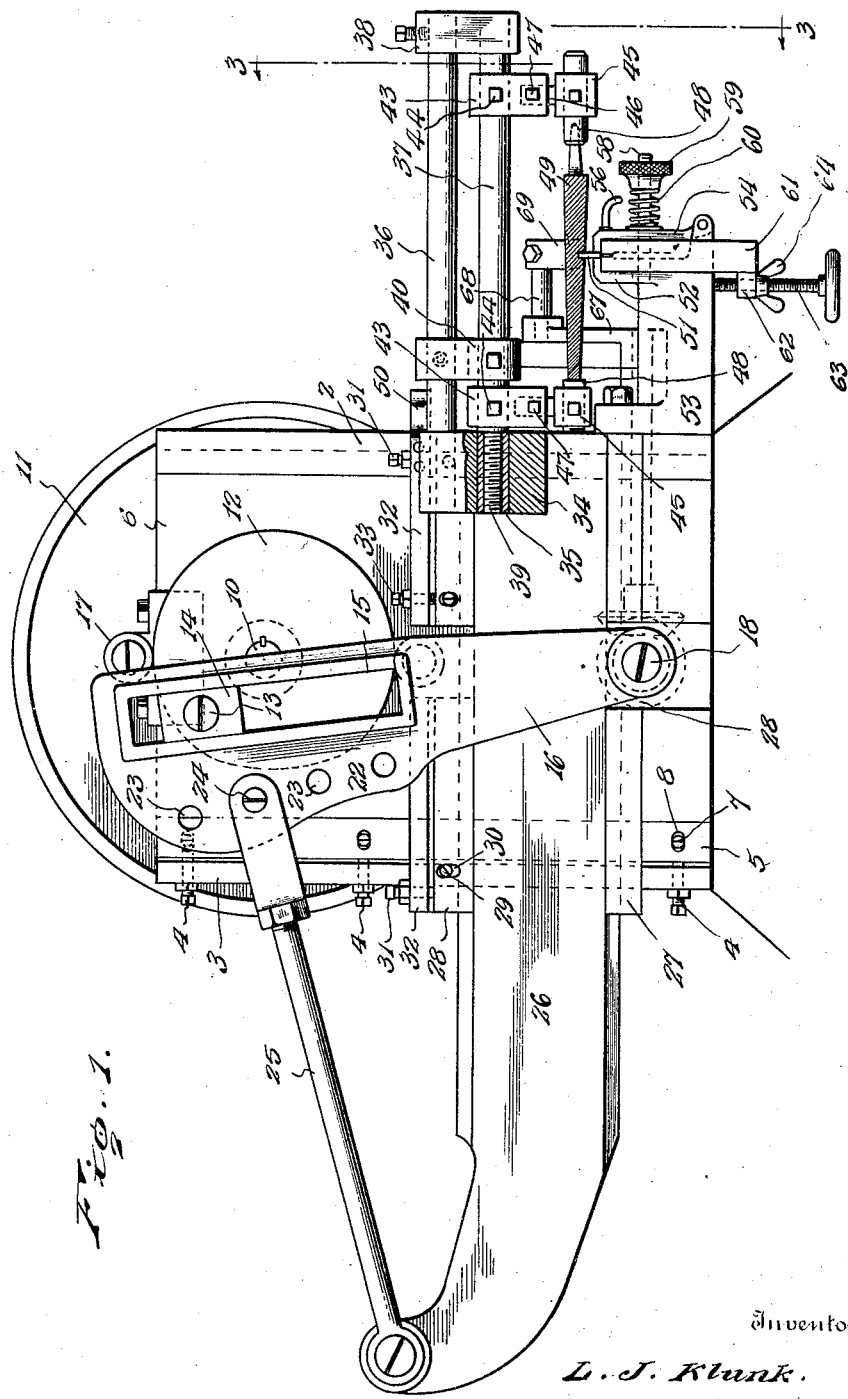
Figure 1 is a front elevation, partly broken away and in section, of a saw-filing machine embodying the present invention.

In carrying out the present invention, there is provided a suitable substantial supporting frame comprising a standard 1 which may be secured in the work room in any convenient or preferred manner. On the front face of the standard along one vertical side edge of the same, there is provided an overhanging or beveled guide rib 2 and at the opposite side edge there is provided a flange 3 in which are mounted set bolts 4 adapted to engage and adjust a guide 5 consisting of a bar extending vertically of the standard and having its inner side edge beveled reversely to the guide rib 2 so that a slide 6 having beveled edges may be readily engaged between the guides to reciprocate vertically, as will be understood upon reference to Fig. 2. The adjustable guide 5 is carried by studs or similar headed supports 7 projecting from the face of the standard through horizontal slots 8 in the guide, as shown in Fig. 1, and the set bolts 4 serve to adjust the guide to compensate for wear and maintain the slide in a true rectilinear path. Upon the back of the standard 1 is provided a bearing 9 through which extends a driving shaft 10, said shaft being equipped at the rear of the bearing 9 with fast and loose pulleys, indicated at 11, whereby power may be applied to the shaft from any convenient source. The shaft 10 extends through the standard and through a vertical slot provided therefor in the slide 6 and is equipped at its front end with a cam disk 12 having a wrist pin 13 rotatably fitted in a box 14 which is slidably mounted in a slot 15 formed in the upper end portion of a main lever 16. The cam disk 12 has its periphery eccentric to the shaft 10 and in contact with rollers 17 carried by the front face of the slide 6 on the central vertical line of the slide and respectively above and below the disk whereby as the disk rotates a vertical reciprocatory movement will be imparted to the slide, as will be understood. Upon reference to Fig. 1, it will be noted that the periphery of the disk has flattened portions, the function of which will later appear. The main lever 16 is secured at its lower end to a rock shaft 18 which is journaled in the lower end portion of the standard and is equipped at its inner or rear end with a beveled pinion 19 meshing with a similar gear or pinion 20 on the inner end of a transmission shaft 21. The main lever 16 is also constructed in its upper end portion with a lateral rib or wing 22 and through the said wing are formed openings 23 in any one of which may be inserted a pivot pin 24 connecting a pitman 25 to the lever. By setting the pivot in a selected opening 23, the throw of the pitman may be regulated to meet the necessities of any given case so that the movement of the file will be commensurate with the stroke necessary to properly sharpen a tooth of any given saw. The pitman 25 extends laterally outward from the main lever 16, as shown in Figs. 1 and 2, and is pivotally attached at its outer end to a bar 26 mounted for reciprocation horizontally in guides secured to the front face of the slide 6. The lower guide 27 is fixed to or formed integral with the slide and is split or recessed at its center, as indicated at 28, to accommodate the shaft 18, as will be understood upon reference to Fig. 1. The upper guide 27' is mounted on pins or studs 29 inserted through vertical slots 30 into the ribs 32 fixed to or formed integral with the slide and is adjusted toward the bar 26 by set bolts 31 which are mounted in said ribs 32 as clearly shown in Fig. 1. The ribs 32 and the guides terminate short of the vertical plane of the shafts 10 and 18 so as to provide clearance for the lower roller on the slide 6, and set bolts 33, corresponding in all respects to the set bolts 31, are mounted in the ribs adjacent their inner ends so that the adjustable guide 27' may be maintained in parallelism with the fixed guide 27.

At the end of the bar 26 remote from the pitman 25 is secured or formed on said bar a block 34 which projects forwardly from the bar and is provided with vertically spaced openings therethrough parallel with the bar, the lower opening having a bushing 35 fitted therethrough and said bushing being internally threaded. These openings receive the inner ends of an upper rod 36 and a lower rod 37 which have their outer ends fitted in and held in proper spaced relation by a block 38. The inner end of the lower rod 37 is externally threaded, as shown at 39, and engages in the bushing 35, this construction causing the rod 37 to be locked in the bushing when the file is making its working stroke but to be loosened therein when the file is on its return stroke. Adjacent the inner ends of the rods 36 and 37, a U-shaped bracket or stirrup 40 is secured rigidly upon the lower rod and has its upper portion spanning the upper rod 36, as shown clearly in Fig. 4, the said upper rod being formed with a socket 41 within the plane of this stirrup and a coiled spring 42 being fitted in the socket and bearing against one side arm of the stirrup, as shown in Fig. 4, whereby the stirrup will be normally held in contact with the front surface of the rod, also as clearly shown in Fig. 4. Carried by the lower rod 37 are file holders each of which includes an upper member 43 secured rigidly to the rod by a set screw, indicated at 44, and a lower member 45 constructed with an upstanding tenon 46 engaging a socket in the lower end of the upper member and secured therein by a set screw, as indicated at 47. The lower members 45 have sleeves 48 inserted therethrough with their axes parallel with the front face of the bar 26 and in alinement, and these sleeves receive and support the ends of the file 49, as shown in Fig. 1, and support the same firmly so that it will be held to its work in the operation of the machine. From what has been said, it will be seen that the file-holding elements must move with the bar 26 and, consequently, the file will be reciprocated whenever the machine is in operation. The shaft 18 actuates mechanism whereby the saw may be fed to present successive teeth to the action of the file which mechanism will be presently described, and during the working stroke of the file the parts will be in the relative positions illustrated. As the file approaches the end of its working stroke, the stirrup 40 will be brought against a throwout member 50 in the form of a finger secured rigidly to the adjacent rib or flange 32 and having its front face disposed at an angle to and extending across the path of the inner side of the stirrup, as shown in Fig. 2, whereby the stirrup will be rocked, and this rocking motion will be imparted directly to the lower rod 37, it being noted that the outer end of the rod 37 is rotatably fitted in the supporting block 38, which block is secured rigidly to the upper holding rod 36. The file holders will, consequently, be rocked transversely to the axis of the file and the file will be withdrawn from the sharpened saw tooth on an oblique line instead of being lifted vertically therefrom.

The saw is indicated at 51, and it will be noted, particularly upon reference to Figs. 3 and 5, that the saw teeth have their advancing edges inclined rearwardly toward the back of the saw and, consequently, the cutting point of each tooth overhangs the trailing end of the preceding tooth. It will also be noted that the file is intended to engage the entire front edge of a tooth in order to properly sharpen the same and it will be obvious that if the file were lifted vertically, after having made its working stroke, it would cut away the overhanging portion of the tooth and would injure the saw instead of increasing its usefulness. To support and guide the saw, there is provided a vise having one jaw 52 formed integral with an arm 53 which is bolted to the standard 1, and a cooperating jaw 54 which is hingedly or pivotally supported at its lower end by lugs 55 projecting from the end of the arm 53. The jaws of the vise extend upwardly in spaced relation and have their upper ends provided with overhanging faces which are adapted to engage the sides of the saw, as clearly shown in Fig. 1, and the movable jaw is provided with a handle member 56 of any desired form whereby it may be moved outwardly when a saw is to be removed or inserted and returned into saw-engaging position after the saw has been placed. The movable jaw is constructed with a vertically extending slot 57 through which passes the shank of a screw 58 having a thumb nut 59 mounted upon its outer end and between the movable jaw and the said nut a spring 60 is coiled around the shank of the screw. By this arrangement the movable jaw may be held in its working position and caused to engage the saw with sufficient firmness to prevent it yielding to the stroke of the file while at the same time when the saw is fed through the vise the spring 59 will yield so as to permit the feeding movement. To prevent buckling of the saw, there is provided a saw-supporting member consisting of a substantially U-shaped frame 61 which spans the lugs 55 and movable jaw, as shown clearly in Figs. 3 and 5. On one side, the base of this supporting frame is provided with a lug 62 through which passes loosely a screw or threaded rod 63 which is secured in and depends from the under side of the arm 53 and upon which is mounted a nut 64, said nut bearing against the under side of the lug 62 and holding the frame in a set position. Obviously, by properly rotating the nut it will ride up or down on the screw or threaded rod and thereby set the frame at the proper height, the frame being pushed upwardly as the nut rides upwardly and dropping by gravity as the nut descends. A shim plate 65 rests edgewise on the upper ends of the side members of the frame 61 which are recessed or notched to accommodate the shim and this shim bears against the back of the saw, as shown clearly in Fig. 5, so that buckling of the saw as it is filed or as it is fed through the vise will be prevented. It will be understood that the shim plate may be of any desired width so that saws of any dimensions may be accommodated.

The shaft 21, previously mentioned, extends through a strengthening rib 66 on the standard 1 and has secured to its outer free end an upstanding crank arm 67 which carries a pin 68 at its upper end. Upon this pin 68 is pivotally mounted a dog 69 which projects forwardly over the saw to engage the teeth thereof, as shown in Fig. 3. When the shaft 21 rocks in one direction, the dog 69 will be drawn rearwardly so that it will ride over the saw teeth and when the shaft rocks in the opposite direction the dog will be moved forwardly to engage a saw tooth and feed the saw through the vise a distance equal to the space between two adjacent teeth so that the saw will be fed step by step to present successive teeth to the action of the file. The crank 67 is adapted to cooperate with devices for adjusting the throw of the dog and cushioning the return stroke of the same which devices are indicated generally at 70, but inasmuch as they are well known in the art a detailed description of the same is deemed unnecessary.

From the foregoing description, taken in connection with the accompanying drawings, it will be understood that, when the main driving shaft is rotating, the slide 6 will be reciprocated vertically and the bar 26 will be reciprocated horizontally. The file-holding devices being secured to and carried by the bar 26 will, of course, reciprocate with said bar so that the file will be reciprocated across the saw and inasmuch as the bar 26 is carried in guides which are fixed to the slide 6, the vertical movement of the said slide will be transmitted to the bar 26 and to the file-holding devices so that the file will be lifted from the saw at the end of its working stroke and returned to the saw at the end of its return stroke. It will, of course, be seen that the engagement of the wrist pin 13 in the box 14 which is slidably mounted in the main lever 16 will not only effect reciprocation of the bar 26 but the oscillation of the main lever will cause the shaft 18 to rock and this movement will be transmitted through the gearing shown and described to the shaft 21 to move the dog 69 in the manner previously stated, and the movement of the parts is so timed that the dog will ride rearwardly over the saw teeth during the working stroke of the file and will engage a saw tooth to feed the saw forward during the return stroke of the file. The main driving shaft and the cam disk 12 rotate in such direction that the working stroke of the file occurs when the wrist pin 13 is in the lower portion of its orbit and inasmuch as the lower portion of the orbit is nearer the center of movement of the main lever than it is to the free end of the lever the speed of the working stroke will be less than the speed of the return stroke because the arc described by the intermediate portion of the main lever is less than the arc described by the outer portion of the lever and less time will be needed for the travel through the arc. The flattened portions of the periphery of the cam disk are so located that there will be a period during which the slide 6 will be at rest and during this period the file will be rocked out of engagement with the saw tooth. It is also to be noted that the disk plays between two rollers so that it will act positively to actuate the slide on both its upward and its downward strokes. As has been stated, as the file approaches the end of its working stroke, the stirrup 40 will engage the throw-off finger 50 and will be rocked, this rocking movement being transmitted to the rod 37 upon which the file holders are directly secured. The direction of the rocking movement is such that the rod 37 will be loosened somewhat in the bushing 35 and the file will be rocked away from the cutting edge of the treated saw tooth. On the return stroke of the file and the parts carrying the same, the stirrup 40 will clear the throw-off device 50 and the spring 42 will then expand so as to impart a reverse rocking movement to the rod 37 which movement will cause said rod to lock itself in the bushing 35 in order that the file will be held rigid during the succeeding working stroke. The return movement of the file will be effected while the slide 6 is at the top of its stroke or during the upper portion of its stroke and the file will not be lowered to the saw until its return stroke has been completed.

Having thus described the invention, I claim:

1. In a saw-filing machine, the combination of a file, means for moving the file across a saw tooth to sharpen the same and imparting a return stroke to the file, means for raising the file for the return stroke and lowering the file for a working stroke, and means for rocking the file during the raising and lowering movements whereby to move it obliquely from a sharpened saw tooth and dispose it against an unsharpened tooth between two working strokes.

2. In a saw-filing machine, the combination with saw supporting and guiding means, of a file, file holders disposed at opposite sides of the saw holding and guiding means, a rod carrying said holders and mounted for rocking movement, means for reciprocating the file across the plane of the saw, means for rocking said rod at the end of each working stroke of the file, means for imparting vertical reciprocating motion to the file, and means whereby the file holders will be locked against rocking during the working stroke of the file and will be loosened for the return stroke of the file.

3. In a saw-filing machine, the combination of file holders, a file carried by and between the holders, means for imparting a horizontal reciprocatory movement to the file holders whereby to draw the file across a saw tooth, means for vertically reciprocating the last-mentioned means whereby to lift the file from a saw and return it thereto, and means for rocking the file away from a saw tooth at the end of its working stroke.

4. In a saw-filing machine, the combination of a horizontally reciprocating bar, a rod carried by the said reciprocating bar, file holders secured upon said rod, a file carried by the holders, a stirrup secured to said rod, yieldable means coacting with the stirrup to hold the file to a saw tooth during its working stroke, a throw-off device arranged in the path of the stirrup to rock the same and the rod whereby to rock the file away from a saw tooth at the end of its working stroke, and means for vertically reciprocating the reciprocatory bar whereby to lift the file from a saw and return it to a saw.

5. In a saw-filing machine, the combination of a horizontally reciprocating bar, upper and lower rods carried by said bar, the lower rod being mounted for rocking movement, file holders secured to said lower bar, a file carried by and between said file holders, a stirrup secured to the lower bar and spanning the upper bar, a spring seated in the upper bar and bearing against the stirrup to yieldably hold the file to a saw tooth, and a throw-off finger mounted in the path of the stirrup to be engaged by the same at the end of the working stroke of the file whereby to rock the file away from the saw tooth.

6. In a saw-filing machine, the combination of a standard having vertical ways on its front face, a slide engaged in and extending between said ways, a cam disk mounted in front of the slide, upper and lower rollers on the slide engaging the periphery of the cam disk, a horizontally reciprocatory bar carried by the slide, a file carried by said bar, a main lever pivoted at its lower end at a point below the cam disk and provided with a longitudinal slot in its upper portion, a pitman connecting the lever with the horizontal reciprocatory bar, and a wrist pin carried by the cam disk and having sliding engagement within the slot of the lever.

7. In a saw-filing machine, the combination of a supporting frame, a vise comprising a jaw fixed to the frame, and a movable jaw cooperating with the fixed jaw to engage a saw and guide the same between the jaws, yieldable means for holding the movable jaw to the saw, a U-shaped frame spanning the movable jaw, means for securing said frame to the main supporting frame, and a shim plate resting on and spanning the extremities of the U-shaped frame and bearing against the back of a saw whereby to support the saw between the jaws of the vise.

8. In a saw-filing machine, the combination with saw-supporting and guiding means, of a file, file holders disposed at opposite sides of the saw-supporting and guiding means, a rod carrying said holders and mounted for rocking movement, means for reciprocating the file across the plane of the saw, means for rocking said rod at the end of each working stroke of the file, means for imparting vertical reciprocating motion to the file, and an internally threaded bushing fixed relative to the file-reciprocating means, the end of the rod which carries the file holders being threaded and engaged in said bushing whereby the rocking of the rod will lock it in the bushing for the working stroke of the file.

In testimony whereof I affix my signature.

LOUIS J. KLUNK. [L. S.]